United States Patent
Lee

(10) Patent No.: US 7,327,652 B2
(45) Date of Patent: *Feb. 5, 2008

(54) METHOD OF RECORDING DATA ON A MULTI-LAYER INFORMATION STORAGE MEDIUM HAVING OPTIMAL POWER CONTROL AREAS

(75) Inventor: Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/431,658

(22) Filed: May 11, 2006

(65) Prior Publication Data

US 2006/0203653 A1   Sep. 14, 2006

Related U.S. Application Data

(63) Continuation of application No. 11/204,180, filed on Aug. 16, 2005, which is a continuation of application No. 10/875,793, filed on Jun. 25, 2004.

(30) Foreign Application Priority Data

Jun. 28, 2003   (KR) .............................. 2003-42996

(51) Int. Cl.
*G11B 15/52* (2006.01)
(52) U.S. Cl. ...................... 369/47.53; 369/94
(58) Field of Classification Search ............... None
See application file for complete search history.

(56) References Cited

U.S. PATENT DOCUMENTS

| 5,614,938 | A | 3/1997 | Sugiyama et al. |
| 2002/0136122 | A1* | 9/2002 | Nakano .................... 369/47.53 |
| 2003/0063535 | A1 | 4/2003 | Shoji et al. |
| 2003/0137909 | A1* | 7/2003 | Ito et al. ................... 369/47.14 |
| 2003/0185121 | A1* | 10/2003 | Narumi et al. ............ 369/47.53 |

FOREIGN PATENT DOCUMENTS

| EP | 1124221 | 8/2001 |
| EP | 1 318 509 | 6/2003 |
| JP | 2000-195054 | 7/2000 |
| WO | WO 00/28532 | 5/2000 |

OTHER PUBLICATIONS

Office Action issued in Taiwanese Patent Application No. 93118477 on May 18, 2006.

(Continued)

*Primary Examiner*—Paul W. Huber
(74) *Attorney, Agent, or Firm*—Stein, McEwen & Bui, LLP

(57) ABSTRACT

An information storage medium having a plurality of information storage layers, each of which includes an optimal power control (OPC) area for obtaining an optimal recording condition, wherein OPC areas in odd-numbered and even-numbered information storage layers are disposed not to face each other and not to contact each other, or partially overlap each other and lock out use of the overlapped portion. Therefore, when an OPC area of one information storage layer performs OPC, this OPC does not affect another information storage layer.

6 Claims, 7 Drawing Sheets

OTHER PUBLICATIONS

*Reference AB (US 2003/0185121) is substantially equivalent to Reference AG (EP 1 318 509).
U.S. Appl. No. 10/866,087, filed Jun. 14, 2004, Kyung-geun Lee, et al.
U.S. Appl. No. 10/875,794, filed Jun. 25, 2004, Kyung-geun Lee.
U.S. Appl. No. 10/875,793, filed Jun. 25, 2004, Kyung-geun Lee.
U.S. Appl. No. 11/204,180, filed Aug. 16, 2005, Kyung-geun Lee.
U.S. Appl. No. 11/431,584, filed May 11, 2006, Kyung-geun Lee.
U.S. Appl. No. 11/431,659, filed May 11, 2006, Kyung-geun Lee.

* cited by examiner

METHOD OF RECORDING DATA ON A MULTI-LAYER INFORMATION STORAGE MEDIUM HAVING OPTIMAL POWER CONTROL AREAS

CROSS-REFERENCE TO RELATED APPLICATIONS

This application is a continuation application of U.S. patent application Ser. No. 11/204,180, filed Aug. 16, 2005, currently pending, which is a continuation application of U.S. patent application Ser. No. 10/875,793, filed Jun. 25, 2004, currently pending, which claims the benefit of Korean Patent Application No. 2003-42996, filed on Jun. 28, 2003 in the Korean Intellectual Property Office, the disclosures of which are incorporated herein in their entirety by reference.

BACKGROUND OF THE INVENTION

1. Field of the Invention

The present invention relates to recordable information storage media, and more particularly, to an information storage medium which minimizes an influence of optimal power control (OPC) process executed in an OPC area included in each of information storage layers upon other information storage layers of the information storage medium.

2. Description of the Related Art

General information storage media are widely used as information recording media of optical pickup apparatuses for recording/reproducing data in a non-contact way. Optical disks are used as the information storage medium and classified as compact disks (CDs) or digital versatile disks (DVDs) according to their information storage capacity. Examples of recordable, erasable, and reproducible optical disks are 650 MB CD-R, CD-RW, 4.7 GB DVD+RW, and the like. Furthermore, high density-DVDs (HD-DVDs) having a recording capacity of 25 GB or greater are under development.

As described above, information storage media have been developed to have a greater recording capacity. The recording capacity of an information storage medium can be increased in two representative ways of: 1) reducing the wavelength of a recording beam emitted from a light source; and 2) increasing the numerical aperture of an objective lens. In addition, there is a way of forming a plurality of information storage layers.

FIGS. 1A and 1B schematically illustrate a dual-layered information storage medium having first and second information storage layers L0 and L1. The first and second information storage layers L0 and L1 include first and second optimal power control (OPC) areas 111 and 121, respectively, for obtaining optimal writing power and first and second defect management area (DMAs) 115 and 125, respectively. The first and second OPC areas 111 and 121 face each other (i.e, are disposed at a common radius relative to an inner or outer boundary of the information storage medium).

Data is recorded in the first and second OPC areas 111 and 121 using various levels of writing power to find the optimum writing power. Hence, data may be recorded with a higher level of power than the optimum writing power. Table 1 shows variations in the jitter characteristics of each of the first and second information storage layers L0 and L1 when data is recorded in the OPC areas 111 and 121 with different levels of writing power.

TABLE 1

|  |  | Normal writing power | | | | Writing power about 20% higher than normal writing power | |
| --- | --- | --- | --- | --- | --- | --- | --- |
| | L0 | Writing | Unwritten | Writing | Written | Writing | Written |
| | L1 | Unwritten | Writing | Written | Writing | Written | Writing |
| Jitter | L0 | 5.9% | | 6.0% | 5.8% | | 5.9%->6.4% |
| | L1 | | 6.3% | 6.2% | 6.3% | 6.2%->6.3% | |
| Writing Power | L0 | 6.4 | | 6.3 | 6.3 | 7.5 | 6.4 |
| | L1 | | 6.0 | 6.0 | 6.2 | 6.0 | 7.2 |

According to Table 1, if data is recorded with normal writing power, the jitter characteristics of the first or second information storage layer L0 or L1 keep constant. On the other hand, if data is recorded with writing power about 20% higher than the normal writing power, the jitter characteristics of the OPC area of the first or second information storage layer L0 or L1 in which data has already been recorded are degraded. If data is recorded on one of the first and second information storage layers L0 and L1 with writing power more than 20% higher than the normal writing power, it can be expected that the jitter characteristics of the other information storage layer may be further degraded.

Hence, if the first and second OPC areas 111 and 121 of the first and second information storage layers L0 and L1 exist within an equal radius as shown in FIGS. 1A and 1B, one of them may not be usable.

The recording status of one of the first and second OPC areas 111 and 121 may affect the recording characteristics of the other OPC area. For example, as shown in FIG. 1B, if data has been recorded on a part 111a of the first OPC area 111 and no data has been recorded on the residual area 111b thereof, the recording property of a part of the second OPC area 121 which corresponds to the occupied part 111a of the first OPC area 111 is different from that of a part of the second OPC area 121 which corresponds to the unoccupied part 111b of the first OPC area 111. In other words, since the transmittance of a laser with respect to the occupied part 111a of the first OPC area 111 is different from the transmittance of a laser with respect to the unoccupied part 111b thereof, the recording property of the second OPC area 121 may be irregular over the area.

As described above, if the first and second OPC areas are disposed within an equal radius, they may not properly function.

SUMMARY OF THE INVENTION

According to an aspect of the present invention, an information storage medium which minimizes an influence of optimal power control (OPC) executed in an OPC area included in each of a plurality of information storage layers upon other information storage layers is provided.

According to an aspect of the present invention, there is provided an information storage medium having a plurality of information storage layers, each of which includes an optimal power control area for obtaining an optimal recording condition, wherein optimal power control areas in odd-numbered and even-numbered information storage layers are disposed within different radiuses of the information storage medium and reserved areas are disposed adjacent to each of the OPC areas.

According to another aspect of the present invention, there is provided an information storage medium having a plurality of information storage layers, each of which includes an optimal power control area for obtaining an optimal recording condition, wherein optimal power control areas in odd-numbered and even-numbered information storage layers are disposed one on another such that each optimal power control area is partially overlapped by another optimal power control area.

According to another aspect of the present invention, there is provided an information storage medium having a plurality of information storage layers, each of which includes an optimal power control area for obtaining an optimal recording condition, wherein optimal power control areas in odd-numbered and even-numbered information storage layers viewed from a direction in which light is incident upon the information storage medium are disposed within an identical radius of the information storage medium, and directions in which the optimal power control areas in odd-numbered and even-numbered information storage layers are used are opposite.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other aspects and advantages of the present invention will become more apparent by describing in detail exemplary embodiments thereof with reference to the attached drawings of which.

DETAILED DESCRIPTION OF THE EMBODIMENTS

Figure 1A:
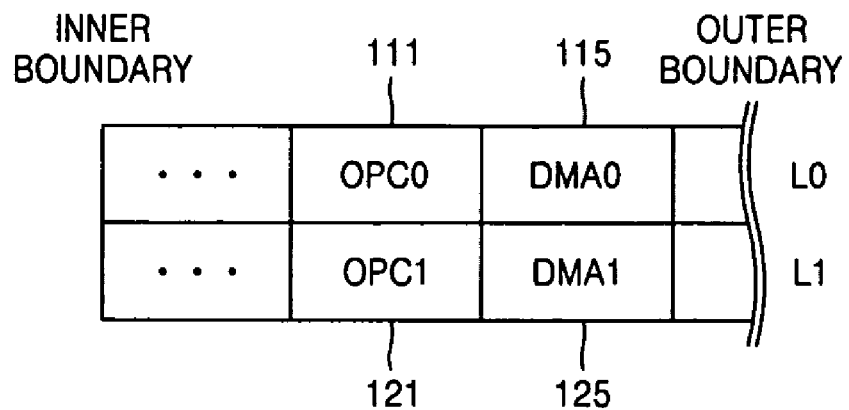
FIGS. 1A and 1B are views illustrating an influence of an OPC area upon an area other than the OPC area in a conventional dual-layered information storage medium.
Figure 1B:
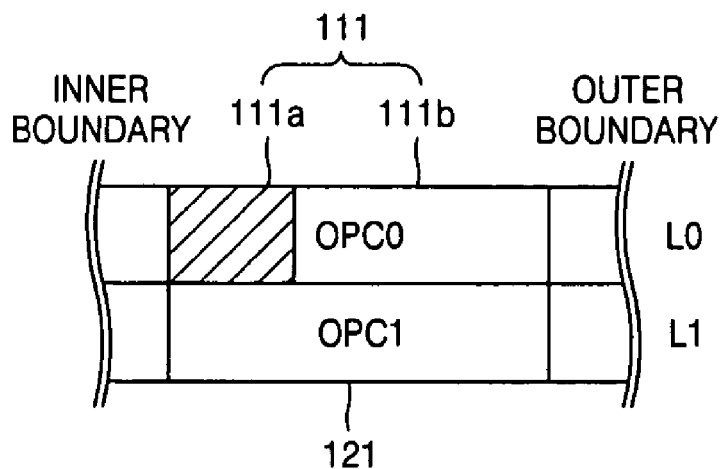

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
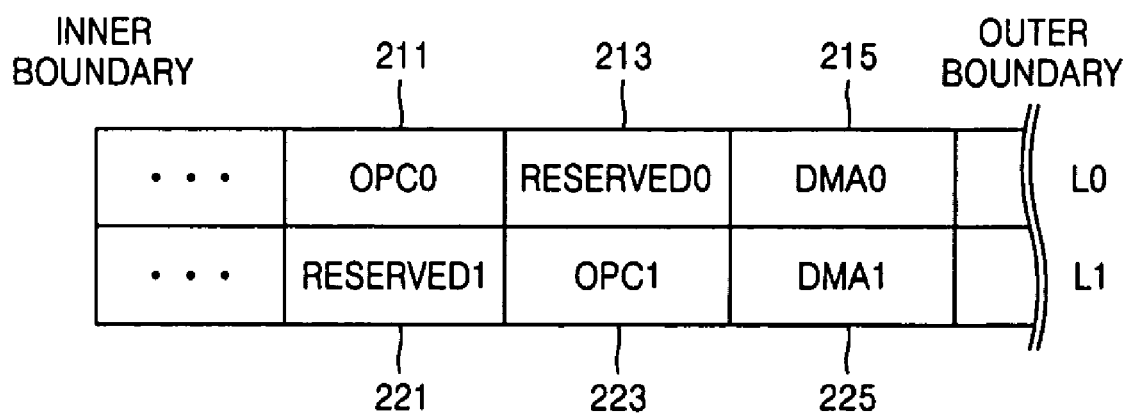
FIG. 2 illustrates a layout of a data area of a dual-layered information storage medium according to an embodiment of the present invention.

Referring to FIG. 2, an information storage medium according to an embodiment of the present invention includes at least two information storage layers L0, L1, each of which includes an optimal power control (OPC) area for obtaining optimal power. The OPC areas 211, 223 of the information storage layers are disposed within different radii such that the OPC areas 211, 223 do not face each other. Each of the information storage layers L0, L1 may include a reserved area 213, 221, and a defect management area (DMA) 215, 225. Although not shown, each of the information storage layers may include a map area adjacent to the OPC area.

The information storage medium shown in FIG. 2 includes the first and second information storage layers L0 and L1. The first information storage layer L0 includes a first OPC area 211, a first reserved area 213, and a first defect management area (DMA) 215, and the second information storage layer L1 includes a second reserved area 221, a second OPC area 223, and a second DMA 225.

The first and second OPC areas 211 and 223 in the information storage layers L0 and L1 are disposed within different radii of the information storage medium such that contact with each other is avoided. More specifically, the second reserved area 221 is disposed in an area of the second information storage layer L1 opposite to the first OPC area 211 of the first information storage layer L0, and the first reserved area 213 is disposed in an area of the first information storage layer L0 opposite to the second OPC area 223 of the second information storage layer L1.

The first and second DMAs 215 and 225 of the first and second information storage layers L0 and L1, respectively, are preferably disposed within an identical radius of the information storage medium.

In such a structure as shown in FIG. 2, an address of a used part of an OPC area 211, 223 in each of the information storage layers L0, L1 is recorded at a predetermined location of a lead-in area.

Figure 3A:
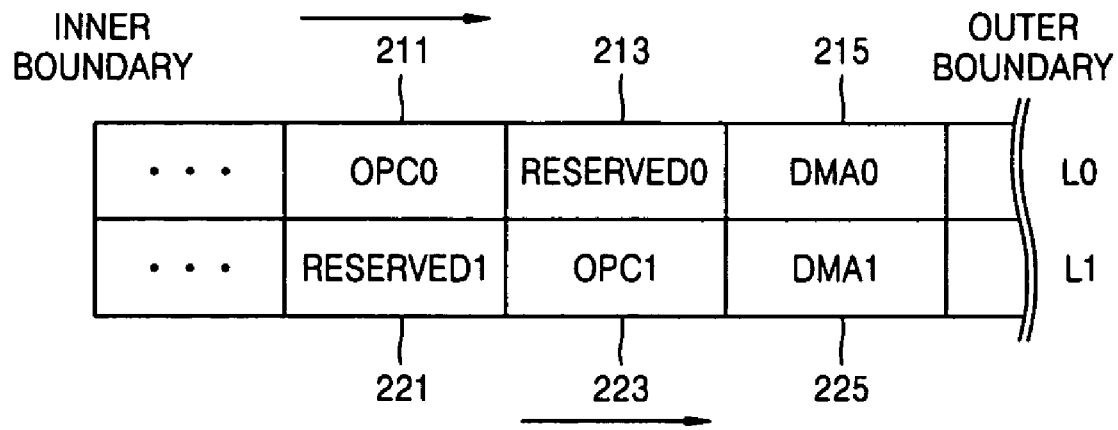
FIGS. 3A and 3B illustrate a case where data is recorded in first and second information storage layers of the information storage medium of FIG. 2 in identical directions.
Figure 3B:
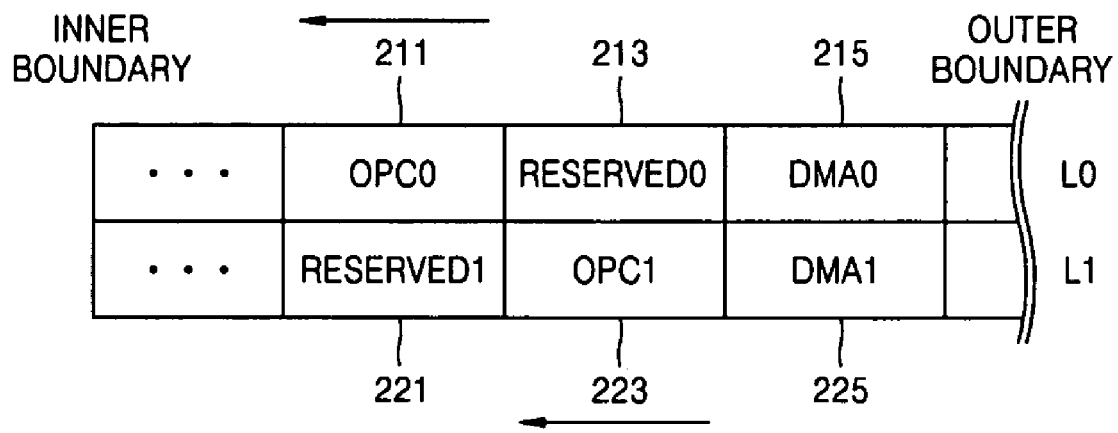

FIGS. 3A and 3B illustrate a case where data is recorded in the first and second information storage layers L0 and L1 of the information storage medium of FIG. 2 in identical directions, that is, a case where both the first and second OPC areas 211 and 223 are accessed in identical sequences. In FIG. 3A, data is recorded in both the first and second information storage layers L0 and L1 in an identical direction from an inner boundary to an outer boundary of the information storage medium of FIG. 2 regardless of a track spiral direction of the information storage medium. Hence, data is recorded in both the OPC areas 211 and 223 of the information storage layers L0 and L1 in the identical direction from the inner boundary to the outer boundary of the information storage medium of FIG. 2.

In FIG. 3B, data is recorded in both the first and second information storage layers L0 and L1 in an identical direction from the outer boundary to the inner boundary of the information storage medium of FIG. 2 regardless of the track spiral direction of the information storage medium. Hence, data is recorded in both the first and second OPC areas 211 and 223 of the information storage layers L0 and L1 in the identical direction from the outer boundary to the inner boundary of the information storage medium of FIG. 2.

In FIGS. 3A and 3B, it is understood that the order of the OPC area 211, 223 and the reserved area arranged in each of the first and second information storage layers L0 and L1 may be inverted.

Figure 4A:
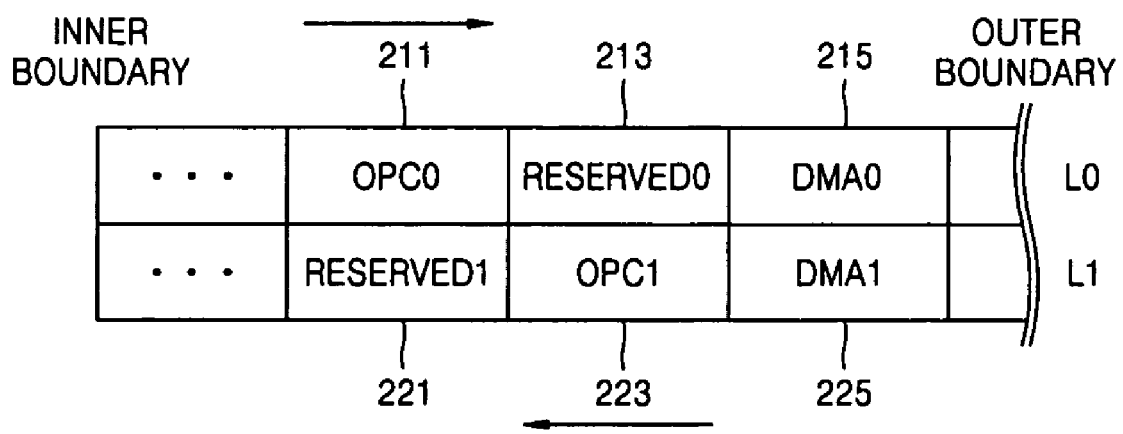
FIGS. 4A and 4B illustrate a case where data is recorded in the first and second information storage layers of the information storage medium of FIG. 2 in different directions.
Figure 4B:
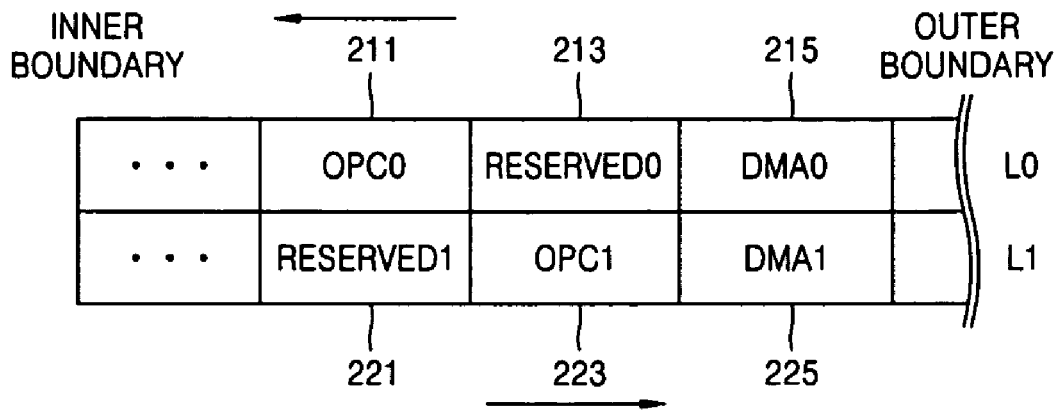

FIGS. 4A and 4B illustrate a case where data is recorded in the first and second information storage layers L0 and L1 of the information storage medium of FIG. 2 in different directions, that is, a case where both the OPC areas 211 and 223 are accessed in different sequences. In FIG. 4A, regardless of the track spiral direction of the information storage medium of FIG. 2, data is recorded in the first information storage layer L0 from the inner boundary to the outer boundary of the information storage medium of FIG. 2, and data is recorded in the second information storage layer L1 from the outer boundary to the inner boundary of the information storage medium. Hence, data is recorded in the OPC area 211 of the first information storage layer L0 from the inner boundary to the outer boundary of the information storage medium of FIG. 2, and data is recorded in the second OPC area 223 of the second information storage layer L1 from the outer boundary to the inner boundary of the information storage medium of FIG. 2.

In FIG. 4B, regardless of the track spiral direction of the information storage medium of FIG. 2, data is recorded in the first information storage layer L0 from the outer boundary to the inner boundary of the information storage medium, and data is recorded in the second information storage layer L1 from the inner boundary to the outer boundary of the information storage medium. Hence, data is recorded in the first OPC area 211 of the first information storage layers L0 from the outer boundary to the inner boundary of the information storage medium of FIG. 2, and data is recorded in the second OPC area 223 of the second information storage layers L1 from the inner boundary to the outer boundary of the information storage medium of FIG. 2.

In FIGS. 4A and 4B, it is understood that the order of the OPC area and the reserved area arranged in each of the first and second information storage layers L0 and L1 may be inverted.

Figure 5A:
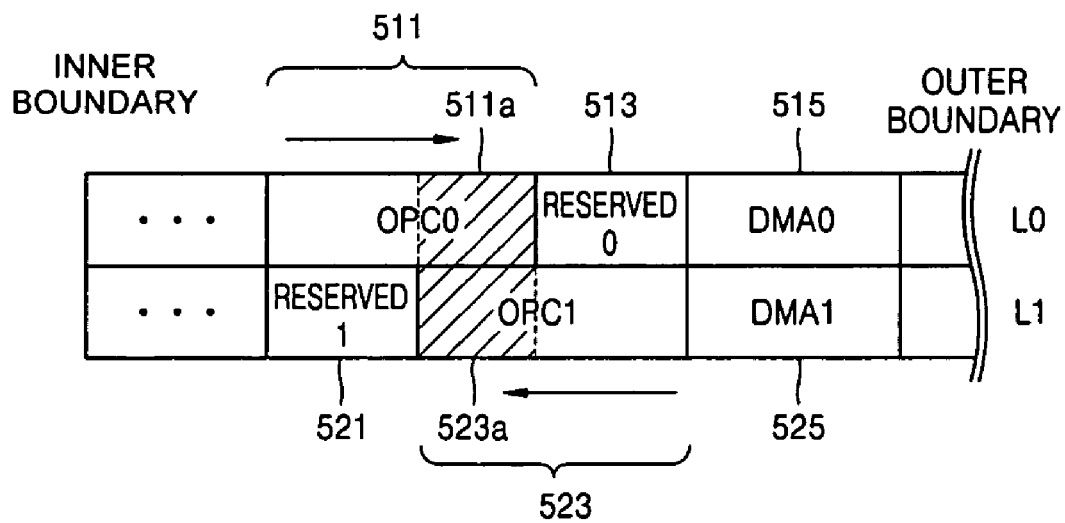
FIGS. 5A and 5B illustrate a layout of a data area of a dual-layered information storage medium according to another embodiment of the present invention.
Figure 5B:
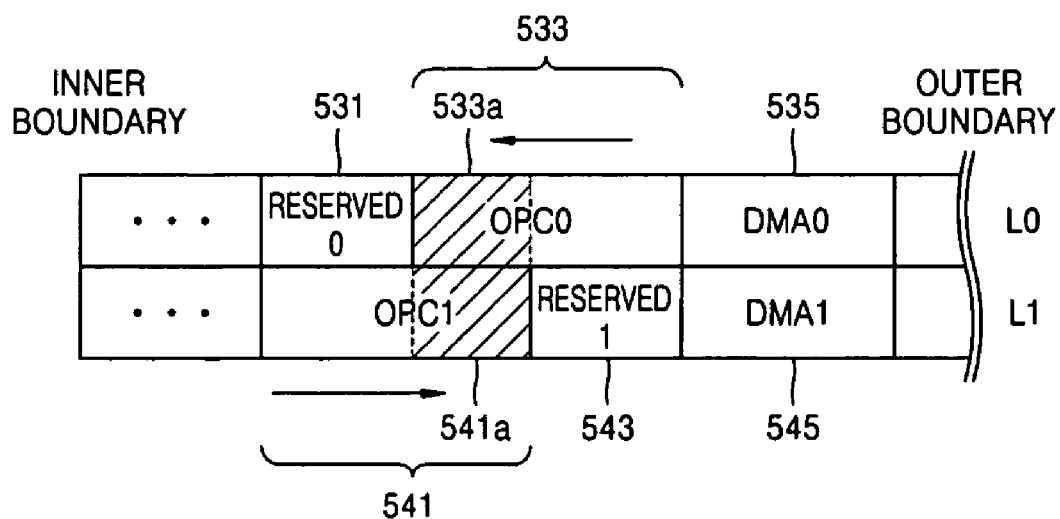

FIGS. 5A and 5B illustrate an information storage medium according to another embodiment of the present invention, in which a location of an OPC area in an information storage layer is partially overlapped by that in another information storage layer. In this aspect of the information storage medium, the size of a reserved area 513, 531, 521, 543 having a low probability of being used is preferably, but not necessarily, smaller than that of the OPC area 511, 533, 523, 541. When the locations of the OPC areas 533, 541 in different information storage layers L0, L1 are partially overlapped by each other, an address of a used part of the OPC area 511a, 533a, 523a, 541a in each of the first and second information storage layers L0 and L1 is recorded in a lead-in area or the like to prevent the OPC areas with the identical radius in the different information storage layers from being used together to record data. An OPC area address can be recorded in various forms, for example, in the form of a bitmap.

In FIG. 5A, data is recorded in a first information storage layer L0 from the inner boundary to the outer boundary of the information storage medium, and data is recorded in a second information storage layer L1 from the outer boundary to the inner boundary of the information storage medium. The first information storage layer L0 includes a first OPC area 511, a first reserved area 513, and a first DMA 515, and the second information storage layer L1 includes a second OPC area 523, a second reserved area 521, and a second DMA 525.

The first and second OPC areas 511 and 523 of the first and second information storage layers L0 and L1, respectively, are disposed within different radii of the information storage medium to be partially overlapped by each other. More specifically, the second reserved area 521 and a second part 523a of the second OPC area 523 of the second information storage layer L1 are disposed opposite to the first OPC area 511 of the first information storage layer L0, and a first part 511a of the first OPC area 511 and the first reserved area 513 of the first information storage layer L0 are disposed opposite to the second OPC area 523 of the second information storage layer L1.

In FIG. 5B, data is recorded in a first information storage layer L0 from the outer boundary to the inner boundary of the information storage medium, and data is recorded in a second information storage layer L1 from the inner boundary to the outer boundary of the information storage medium. The first information storage layer L0 includes a first OPC area 533, a first reserved area 531, and a first DMA 535, and the second information storage layer L1 includes a second OPC area 541, a second reserved area 543, and a second DMA 545.

The first and second OPC areas 533 and 541 of the first and second information storage layers L0 and L1, respectively, are disposed within different radii of the information storage medium to be partially overlapped by each other. More specifically, a second part 541a of the second OPC area 541 and the second reserved area 543 are disposed opposite to the first OPC area 533 of the first information storage layer L0, and the first reserved area 531 and a first part 533a of the first OPC area 533 are disposed opposite to the second OPC area 541 of the second information storage layer L1.

In such a structure as illustrated in FIGS. 5A and 5B, an address of a used part of an OPC area 511, 523, 533, 541 in each information storage layers L0, L1 is recorded in a predetermined location of a lead-in area, for example, in a disk information area.

The size of an actually usable part of an OPC area 511, 523, 533, 541 in each of the different information storage layers L0, L1 of an information storage medium as illustrated in FIGS. 5A and 5B varies depending on a frequency of the use of each of the information storage layers L0, L1 and information about an address of a used part of the OPC area 511, 523, 533, 541.

Figure 6:
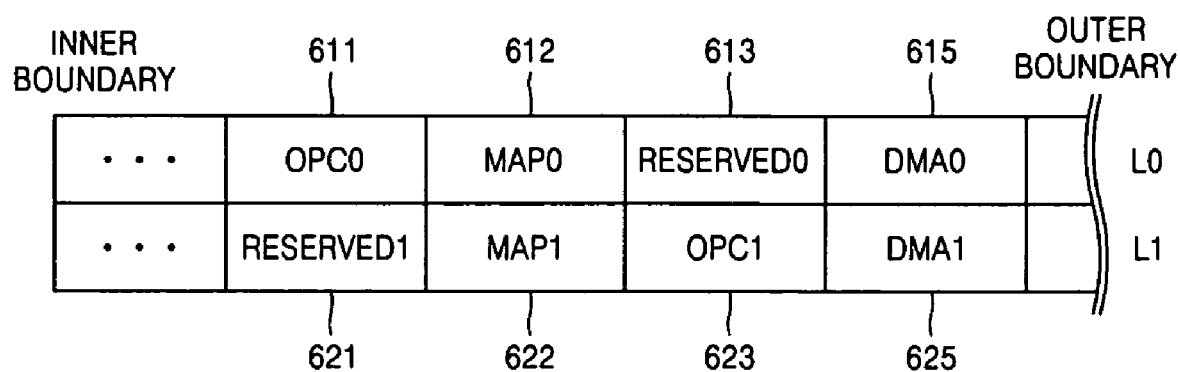
FIG. 6 illustrates a layout of a data area of a dual-layered information storage medium according to another embodiment of the present invention.

FIG. 6 illustrates an information storage medium according to another embodiment of the present invention. In the first and second information storage layers L0 and L1 of FIG. 6, a map area 612, 622 for recording an address of a used part of an OPC area is disposed adjacent to each of the OPC areas 611, 623. When such a map area is disposed adjacent to an OPC area in each information storage layer as described above, a usable part of the OPC area can be rapidly identified before the OPC is performed in each information storage layer. Thus, a time required to perform the OPC can be shortened.

In FIG. 6, the first information storage layer L0 includes a first OPC area 611, a first map area 612, a first reserved area 613, and a first DMA 615, and the second information storage layer L1 includes a second reserved area 621, a second map area 622, a second OPC area 623, and a second DMA 625. The first and second map areas 612 and 622 are disposed within an identical radius of the information storage medium, and likewise for the first and second DMAs 615 and 625 are disposed on the same radius.

In the information storage medium of FIG. 6, directions in which data is recorded in the OPC areas 611 and 623 of the information storage layers L0 and L1 are either in the same direction as illustrated in FIGS. 3A and 3B or in different directions as illustrated in FIGS. 4A and 4B.

Figure 7:
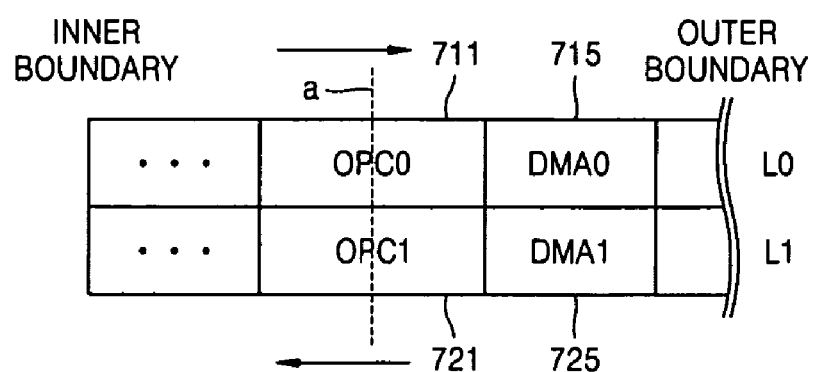
FIG. 7 illustrates a layout of a data area of a dual-layered information storage medium according to another embodiment of the present invention.

FIG. 7 illustrates an information storage medium according to yet another embodiment of the present invention. In FIG. 7, first and second OPC areas 711 and 721 of first and second information storage layers L0 and L1 are disposed within an identical radius of the information storage medium, and directions in which data is recorded in the first and second information storage layers L0 and L1 are set to be different. The first and second information storage layers L0 and L1 also include first and second DMAs 715 and 725, respectively. In FIG. 7, directions of data recording in the first and second information storage layers L0 and L1 are from an inner boundary to an outer boundary of the information storage medium and from the outer boundary to the inner boundary, respectively. However, the directions of data recording in the first and second information storage layers L0 and L1 may be from the outer boundary to the inner boundary of the information storage medium and from the inner boundary to the outer boundary, respectively.

When OPC areas 711, 721 in information storage layers L0, L1 are disposed within an identical radius of an information storage medium, addresses of used parts of the OPC areas 711, 721 in the information storage layers L0, L1 are recorded in a lead-in area or the like to prevent OPC areas 711, 721 of the identical radius in the information storage layers from being used together upon data recording. Accordingly, if directions in which data is recorded in the first and second OPC areas 711 and 721 are set to be different even though the first and second OPC areas 711 and 721 are disposed within an identical radius of the information storage medium of FIG. 7, a part of each of the OPC areas 711 and 721 ranging up to an address 'a' can be used upon data recording. The address 'a' denotes an address where data recording in the first OPC area 711 coincides with data recording in the second OPC area 721.

The size of an actually usable part of an OPC area 711, 721 in each information storage layer L0, L1 of an information storage medium as illustrated in FIG. 7 varies depending on a frequency of the use of each of the information storage layers L0, L1 and information about an address of a used part of the OPC area 711, 721. Such a structure can be usefully applied to a small mobile information storage medium in which a large capacity of data is recorded.

Figure 8:
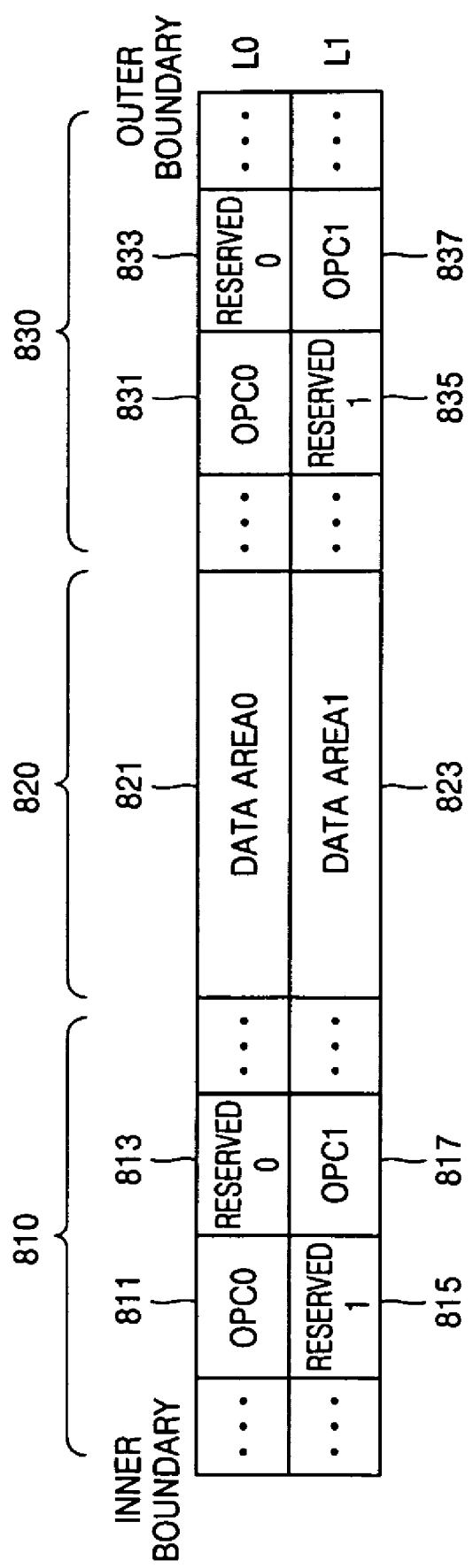
FIG. 8 illustrates a layout of a data area of a dual-layered information storage medium according to a further embodiment of the present invention.

FIG. 8 illustrates an information storage medium according to another embodiment of the present invention. Considering the fact that characteristics of data recording in inner and outer boundaries of an information storage medium may be different, OPC areas are disposed in at least one of the lead-in and lead-out areas 810 and 830 of the information storage medium of FIG. 8, which are disposed on both sides of a data area 820. In first and second information storage layers L0 and L1 of FIG. 8, first and second OPC areas 811 and 817 of the lead-in area 810 and third and forth OPC areas 831 and 837 of the lead-out area 830 may be disposed using one of the arrangements illustrated in FIGS. 2 through 6 incorporating the first and third reserved areas 813 and 833 and the data area 821 of the first information storage layer L0, and the second and third reserved areas 817, 835 of the second information storage layer L1.

Figure 9:
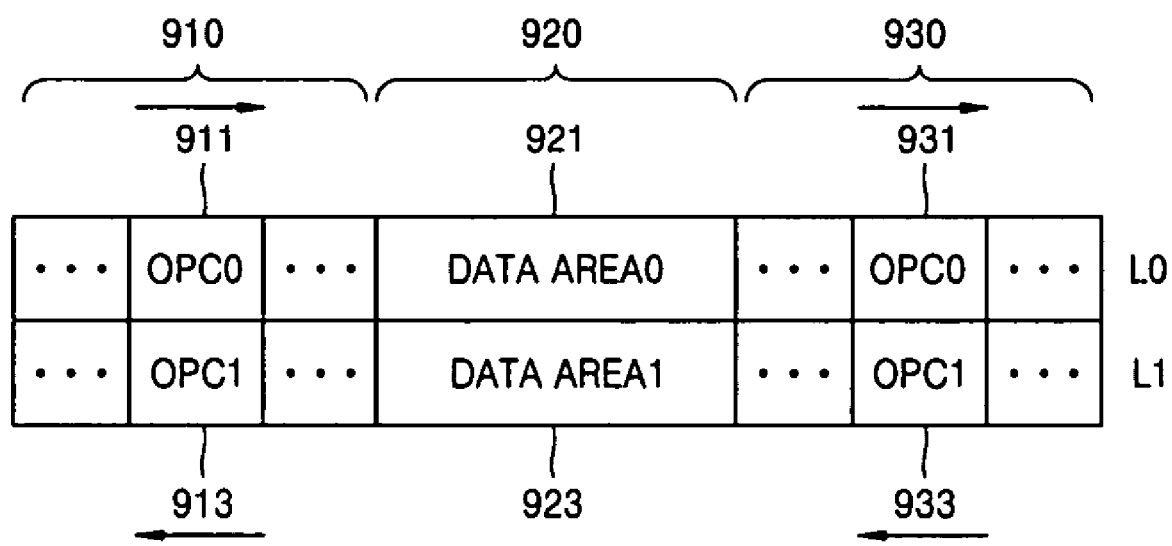
FIG. 9 illustrates a layout of a data area of a dual-layered information storage medium according to another embodiment of the present invention.

FIG. 9 illustrates an information storage medium according to another embodiment of the present invention. As illustrated in FIG. 7, first and second OPC areas 911 and 913 in which data is recorded in opposite directions are disposed in a lead-in area 910 within an identical radius of the information storage medium, and third and forth OPC areas 931 and 933 in which data is recorded in opposite directions are disposed in a lead-out area 930 within an identical radius of the information storage medium. The lead-in area 910 and the lead-out area 930 are disposed on opposite sides of a data area 920, which includes first and second data areas 921 and 923 of the first and second information storage layers L0 and L1, respectively.

Figure 10:
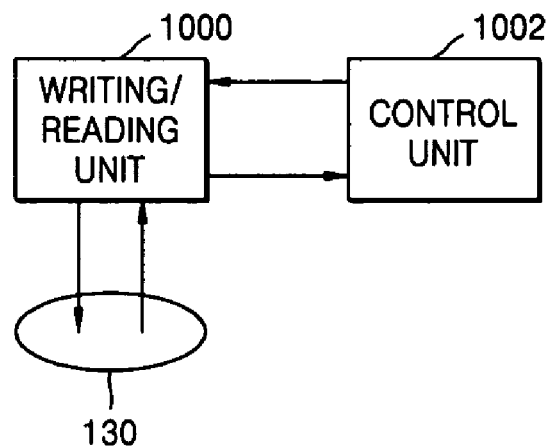
FIG. 10 is a block diagram of an apparatus for recording/reproducing information to/from the information storage medium of FIGS. 2-9 according to an embodiment of the present invention.

FIG. 10 is a block diagram of an optical recording and/or reproducing apparatus according to an embodiment of the present invention in which the information storage media of FIGS. 2-9 are implemented. Referring to FIG. 10, the recording and/or reproducing apparatus includes a writing/reading unit 1000 and a control unit 1002. The writing/reading unit 1000 reads from and writes to the information storage medium 130 according to commands from the control unit 1002. Here, the information storage medium 130 includes several embodiments shown in FIGS. 2 through 9 and the control unit 1002 controls data writing/reading operations of the writing/reading unit 1000 so as to minimize interference between a first optimal power control area in a first information storage layer L0 and a second optimal power control area in a second information storage layer L1 of the information storage medium 130.

Referring to FIG. 10, according to the control of the control unit 1002, the writing/reading unit 1000 records data on a disc 130, which is an information storage medium according to embodiments of the present invention, and reads out data in order to reproduce recorded data. The control unit 1002 controls the writing/reading unit 1000 so that the writing/reading unit 1000 records data in predetermined recording unit blocks, or processes data read by the writing/reading unit 1000 and obtains valid data. Reproducing refers to obtaining valid data by performing error correction for the read data, and is performed in predetermined units. The units for performing reproduction are referred to as reproducing unit blocks. A reproducing unit block corresponds to at least one recording unit block.

Figure 11:
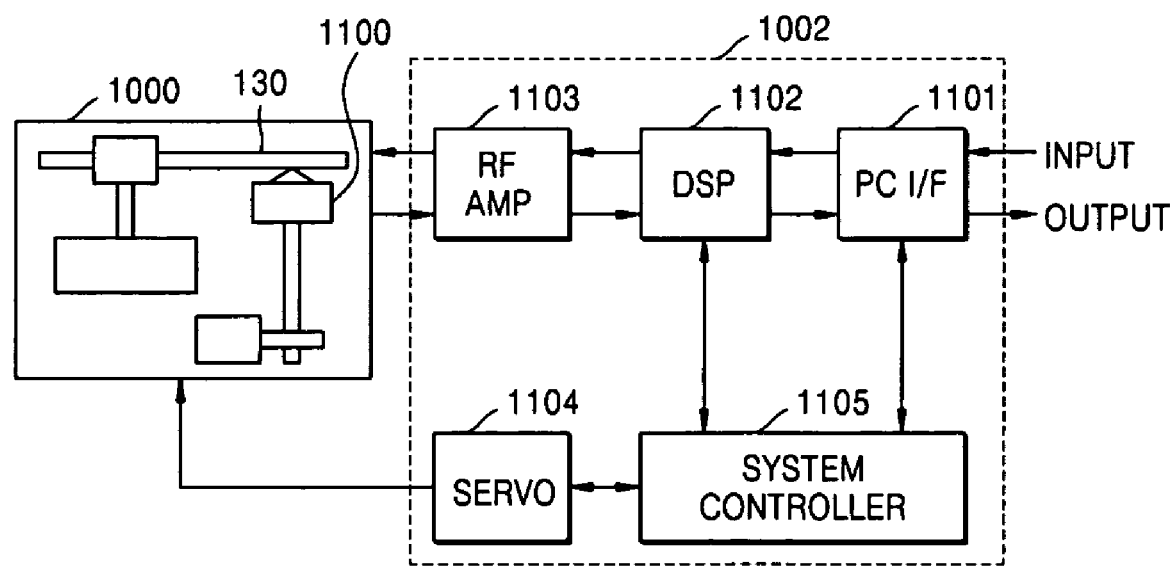
FIG. 11 is a more detailed block diagram of the recording and/or reproducing apparatus of FIG. 10.

FIG. 11 is a more detailed block diagram of the optical recording and/or reproducing apparatus of FIG. 10. Referring to FIG. 11, the information storage medium 130 is loaded in the writing/reading unit 1000. The recording and/or reproducing apparatus further includes an optical pickup 1100 that reads from and writes to the information storage medium 130. The control unit 1002 includes a PC I/F 1101, a DSP 1102, an RF AMP 1103, a servo 1104, and a system controller 1105, all of which constitute the control unit 1002 of FIG. 10.

In the data recording operation, the PC I/F 1101 receives a recording command with data to be recorded from a host.

The DSP 1102 adds additional data such as a parity for error correction of the data received from the PC I/F 1101 and performs error correction and checking (ECC) encoding to generate an ECC block, which is an error correction block, and modulates the ECC block according to a predetermined method. The RF AMP 1103 converts the data output from the DSP 1102 into an RF signal. The pickup 1100 records the RF signal output from the RF AMP 1103 on the disc 130. The servo 1104 receives a command required for servo control from the system controller 1105 and servo-controls the pickup 1100.

In the data reproducing operation, the PC I/F 1101 receives a reproduction command from a host (not shown). The system controller 1105 performs the initialization required for reproduction. The pickup 1100 emits a laser beam onto the disc 130, obtains an optical signal by receiving a reflected beam from the disc 130, and outputs the optical signal. The RF AMP 1103 converts the optical signal output from the pickup 1100 into an RF signal and provides modulated data obtained from the RF signal to the DSP 1102 while providing a servo signal for control of the pickup 1100 obtained from the RF signal to the servo 1104. The DSP 1102 demodulates the modulated data, performs error correction and outputs the resulting data. Meanwhile, the servo 1104 performs servo control of the pickup 1100, by using the servo signal received from the RF AMP 1103 and a command required for servo control received from the system controller 1105. The PC I/F 1101 transfers the data received from the DSP 1102 to the host.

The aforementioned OPC area arrangements are applicable to all information storage media regardless of whether a track of each information storage layer is spiraled from an inner boundary to an outer boundary or from the outer boundary to the inner boundary. The aforementioned OPC area arrangements are also applicable to all of the multi-layered information storage media having a plurality of information storage layers regardless of whether an information storage layer to be reproduced first is either an information storage layer farthest from or closest to a pickup. For example, the aspects of the present invention described above are applicable to CD-R, CD-RW, DVD+RW, HD-DVD, Bluray, and Advanced Optical Disc (AOD) type information storage media.

Although the OPC area arrangements have been described with regard to a dual-layered information storage medium having two information storage layers, they may be applied to information storage media having at least three information storage layers which are stacked one on another.

As described above, in an information storage medium having a plurality of information storage layers, an OPC area of one information storage layer may be located over an OPC area of another information storage layer such as not to face each other according to an aspect of the present invention. Therefore, when an OPC area of one information storage layer performs OPC, this OPC does not affect another information storage layer.

Alternatively, the OPC area of one information storage layer may be located over an OPC area of another information storage layer to be partially overlapped by each other, and directions of the use of the OPC areas are set to be different according to an aspect of the present invention. Therefore, when the OPC area of one information storage layer performs OPC, this OPC does not affect another information storage layer.

Alternatively, the OPC area of one information storage layer may be located over an OPC area of another information storage layer face each other, and directions of the use of the OPC areas are set to be different according to an aspect of the present invention. Therefore, when the OPC area of one information storage layer performs OPC, this OPC does not affect another information storage layer.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of recording data to an information storage medium comprising,
   obtaining an optimal recording condition using an optimal power control area in a first information storage layer and/or a second information storage layer;
   recording data to the first and/or second information storage layers according to the obtained optimal recording condition,
   wherein:
   each of the first and second information storage layers includes the optimal power control area and a reserved area disposed adjacent to the optimal power control area, and
   the optimal power control areas in first and second information storage layers are disposed within different radiuses of the information storage medium.

2. The method of claim 1, wherein:
   the first information storage layer includes a map area storing information about the optimal power control area of the first information storage layer and which is disposed adjacent to the optimal power control area,
   the second information storage layer includes a map area storing information about the optimal power control area of the second information storage layer and which is disposed adjacent to the optimal power control area,
   the first and second information storage layers are adjacent, and the map areas of the first and second information storage layers are formed on an identical radius of the information storage medium.

3. The method of claim 1, wherein the information storage medium further comprises information about the optimal power control areas of the first and second information storage layers recorded in a lead-in area where disk-related information is recorded.

4. The method of claim 1, a direction in which the optimal power control area of the first information storage layer is used to store data is identical to a direction in which the optimal power control area of the second information storage layer is used to store data.

5. The method of claim 4, wherein each of the directions in which the optimal power control area of the first and second information storage layers are used is one of a track spiral direction of each of the first and second information storage layers and a direction opposite to the track spiral direction of each of the first and second information storage layers.

6. The method of claim 4, wherein the optimal power control areas are formed in at least one of a lead-in area and a lead-out area.

* * * * *